(No Model.)
J. B. SPRY & T. BARRY.
WAGON RUNNING GEAR.
No. 300,914. Patented June 24, 1884.
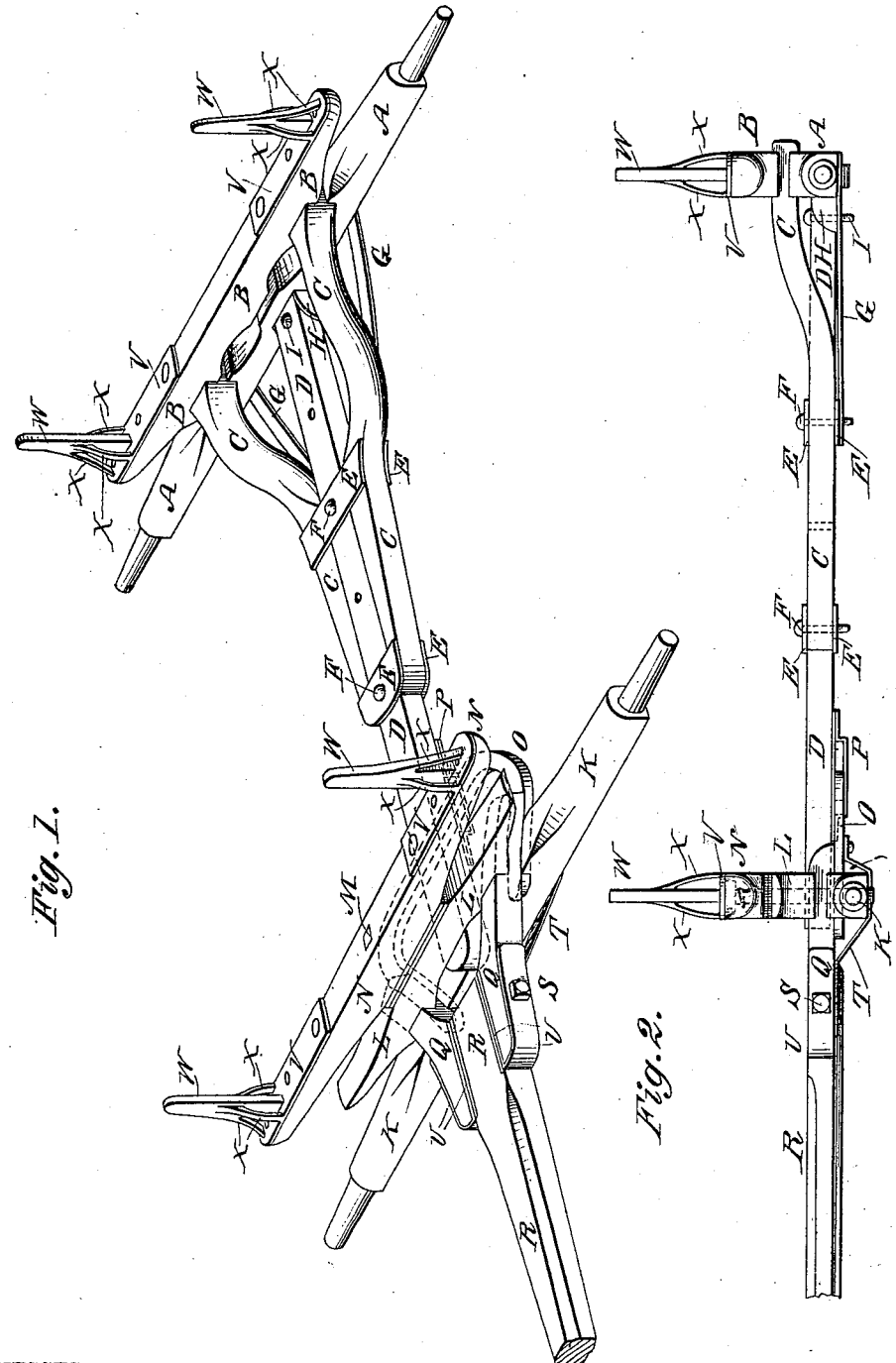
WITNESSES:
INVENTOR:
BY
ATTORNEYS.

United States Patent Office.

JOHN BALL SPRY AND THOMAS BARRY, OF VALPARAISO, INDIANA.

WAGON RUNNING-GEAR.

SPECIFICATION forming part of Letters Patent No. 300,914, dated June 24, 1884.

Application filed October 16, 1883. (No model.)

*To all whom it may concern:*

Be it known that we, JOHN BALL SPRY and THOMAS BARRY, of Valparaiso, in the county of Porter and State of Indiana, have invented a new and useful Improvement in Wagon-Gearings, of which the following is a full, clear, and exact description.

Reference is to be had to the accompanying drawings, forming a part of this specification, in which similar letters of reference indicate corresponding parts in both the figures.

Figure 1 is a perspective view of our improvement. Fig. 2 is a side elevation of the same.

The object of this invention is to facilitate the construction of wagon-gearings and increase the strength and durability of said gearings.

The invention consists of the detailed construction and combination of parts, substantially as hereinafter fully set forth, and pointed out in the claim.

A is the rear axle, to which the rear bolster, B, is secured in the ordinary manner.

C are the rear hounds, the rear ends of which are secured to and between the axle A and bolster B. The hounds C are bent downward and inward, and their forward parts are parallel with each other, and at such a distance apart as to receive the reach D between them. The downward bend of the hounds C allows the reach to be placed level with the lower side of the axle A.

To the upper and lower sides of the parallel forward parts of the hounds C are attached plates E, to connect the said hounds and form a long bearing for the reach D, and through which and the said reach pass bolts F, to secure the reach in place.

To the lower rear plate, E, and the lower side of the axle A are secured metal braces G.

Upon the side edges of the forward part of the strap H, attached to the axle A, and at the forward side of the said axle A, are formed flanges, to form a seat for the reach D, where the said reach is secured by a bolt, I, passing through the reach D and the strap H. The forward end of the reach D passes between the forward axle, K, and the sand-board L, where it is secured in place by the king-bolt M, which passes through the forward bolster, N, the sand-board L, the reach D, and the axle K. By this construction the reach will be level, instead of having the usual downward inclination.

O is the sway-bar, which is formed of a wrought-iron bar, the middle part of which passes through an iron keeper, P, attached to the lower side of the reach D. The end parts of the sway-bar O are curved forward and inward, and are secured between the axle K and the rear ends of the forward hounds, Q, by the bolts that secure the said hounds to the axle K and sand-board L. To and between the hounds Q is hinged the tongue R by the bolt S. The hounds Q are strengthened in place by the brace-straps T, attached to them and to the axle K and sway-bar O. The hounds Q and the parts of the tongue R in contact with them are faced with metal plates U, to prevent wear. Several holes are formed in the reach D, to receive the bolts F, so that the gearing can be adjusted in length as may be required.

To the end parts of the upper sides of the bolsters B N are bolted cast-iron plates V, upon which are cast the stakes W. The stakes W are strengthened at their sides and outer edges by braces X', cast in one piece with the said stakes W and plates V.

Having thus described our invention, we claim as new and desire to secure by Letters Patent—

In running-gears for vehicles, the combination, with the reach D, the rear axle, A, and the bolster B, said reach passing through said axle, of the rear hounds, C, clipped at their forward ends to the reach, and curved or extended at their rear ends upwardly and rearwardly above the plane of the upper surface of the reach, and secured between said bolster and axle, substantially as and for the purpose set forth.

JOHN BALL SPRY.
THOMAS BARRY.

Witnesses:
JAS. G. SMITH,
TEMPLE WINDLE.